United States Patent [19]

Elam

[11] Patent Number: 5,454,241
[45] Date of Patent: Oct. 3, 1995

[54] VEHICLE STEERING WHEEL ANTI THEFT DEVICE

[75] Inventor: David M. Elam, Dalton, United Kingdom

[73] Assignee: Metro Products (Accessories & Leisure) Limited, Oxted, England

[21] Appl. No.: 170,726

[22] Filed: Dec. 21, 1993

[30] Foreign Application Priority Data

Dec. 29, 1992 [GB] United Kingdom ............ 9227057

[51] Int. Cl.$^6$ ................................................. B60R 25/02
[52] U.S. Cl. ............................................ 70/209; 70/226
[58] Field of Search ........................ 70/209, 211, 212, 70/225, 226, 237, 238; D8/331

[56] References Cited

U.S. PATENT DOCUMENTS

| | | | |
|---|---|---|---|
| D. 354,668 | 1/1995 | Elam | D8/331 |
| 1,443,285 | 1/1923 | Smith et al. | 70/212 |
| 4,103,524 | 8/1978 | Mitchell et al. | 70/237 X |
| 4,974,433 | 12/1990 | Wang | 70/238 X |
| 5,092,146 | 3/1992 | Wang | 70/226 X |
| 5,115,652 | 5/1992 | Starmer | 70/226 X |
| 5,128,649 | 7/1992 | Elmer | 70/237 X |
| 5,142,889 | 9/1992 | Liu | 70/209 |
| 5,199,284 | 4/1993 | Lin | 70/209 |
| 5,212,973 | 5/1993 | van Staden et al. | 70/226 X |
| 5,297,406 | 3/1994 | Lin | 70/238 X |

FOREIGN PATENT DOCUMENTS

| | | | |
|---|---|---|---|
| 2718291 | 10/1978 | Germany | 70/211 |
| 4110120 | 10/1991 | Germany. | |
| 1269813 | 4/1972 | United Kingdom. | |
| 2039840 | 8/1980 | United Kingdom | 70/209 |

*Primary Examiner*—Lloyd A. Gall
*Attorney, Agent, or Firm*—Dennison, Meserole, Pollack & Scheiner

[57] ABSTRACT

A device, lockable onto the rim of a vehicle steering wheel, includes a portion in the form of a bar (1) projecting away from the wheel to obstruct steering. The device has a hook member (2) shaped to extend from one end to the other of a segment of a steering wheel rim via a path passing through the wheel with the member hooked over the wheel rim at one end of the segment. The device has a catch (10) movable relative to the hook member (2) and engageable with the steering wheel rim for locking the device to the wheel so that the hook member (2) is engaged about the rim at one end of the segment and the shank (3) of the hook member (2) is secured against the wheel rim at the other end of the segment.

13 Claims, 4 Drawing Sheets

VEHICLE STEERING WHEEL ANTI THEFT DEVICE

BACKGROUND OF THE INVENTION

This invention relates to a vehicle anti-theft device which is lockable onto a vehicle steering wheel with part of the device being in the form of a bar projecting away from the wheel so that it impedes rotation of the wheel and hence obstructs steering of the vehicle.

Devices of that kind are known which comprise a bar which fits diametrally across the steering wheel with a portion of the length of the bar projecting from the wheel rim. An example of such a device is described in United Kingdom Patent 1127524.

Devices of the said kind are also known which comprise a bar with means whereby one end portion of the bar can be locked onto the rim of a steering wheel with the bar projecting generally tangentially from the wheel. An example of a device of that kind is described in U.S. Pat. No. 5,024,069 and United Kingdom Patent 2134057.

Such tangential fitment affords the advantage that the device does not have to pass over the center of the wheel and it can therefore more easily be made suitable for fitting to steering wheels of a variety of different designs, even those which have a hub or an associated air bag which projects forwardly from the plane of the front of the steering wheel.

There is a demand for anti-theft devices which are suitable for fitting to any standard vehicle steering wheel, which can be made at relatively low cost and which renders use of the device as simple and convenient as possible. The present invention contributes to the meeting of this demand.

SUMMARY OF THE INVENTION

The present invention provides a vehicle anti-theft device which is lockable onto the rim of a vehicle steering wheel with part of the device being in the form of a bar projecting away from the wheel so that it obstructs steering, characterised in that, for securing it to the rim of a steering wheel, the device has a hook member, comprising a hook and a shank, shaped so that it can extend from one end to the other of a segment of a steering wheel rim via a path passing through the wheel with the member hooked over the wheel rim at one end of such segment, and the device having means, including a catch member, for locking the hook member in such relationship to the wheel that the hook is engaged about the rim at one end of said segment and the shank which is integral with the hook is secured so as to lie against the wheel rim at the other end of said segment.

The provision of a hook member for coupling the device to a steering wheel in the manner described is conducive to making the device easy to use and highly resistant to unauthorised removal or inactivation.

In preferred embodiments of the invention the hook and the shank are an extension of the bar which forms or forms part of the steering-obstructing part of the device.

The hook member can be of such shape and length that in the coupled condition of the device the hook member and the catch member bridge only a small segment of the steering wheel rim, preferably a segment subtending an angle of less than 100° at the center of the wheel. The device can therefore be of relatively small overall length.

The steering-obstructing part of the device is preferably in the form of a straight bar. And it is preferable for the hook member to be an endwise extension of such bar. Advantageously the bar is hollow and slides along the hook shank. In such case, when the device is in use locked to the wheel rim, the bar projects from the wheel rim in line with a notional chord joining the ends of the segment of the steering wheel rim which is bridged by the hook member and the catch member.

Preferably the shape and dimensions of the hook member are such that when the device is in use the steering-obstructing bar part of the device projects away from the wheel rim along a notional line tangential or nearly tangential to the steering wheel rim.

The locking means must prevent any movement of the bar relative to the steering wheel such as would allow the device to be unhooked. Forward and backward movements of the bar relative to the wheel can be prevented or limited by the catch member which can be extended and locked in a position in which a portion of the steering wheel rim adjacent the bar is trapped between the catch member and the hook shank. Movement of the bar in the general plane of the wheel rim can be prevented or limited on the one hand by abutment against the wheel rim of the part of the hook shank which passes through the wheel, and on the other hand by abutment of part of the device against the outside of the wheel rim. In the locking position of the catch member, the device is essentially S-shaped in configuration for securing the device to the steering wheel rim.

The invention includes a vehicle anti-theft device of the kind referred to, comprising a steering-obstructing bar having integral means for securing such bar to a steering wheel, such means comprising (i) a hook member having a shank which extends from the bar and is of such shape and length that by bodily manipulation of the device the hook can be inserted through the wheel from the rear thereof and hooked over the wheel rim, and then swung into a position in which a portion of the hook shank which is located within the wheel bears against or is close to the wheel rim and forward movement of the bar is obstructed by contact of the hook and the shank with the wheel rim, and (ii) locking means which is then operable for locking the device against removal from the wheel, said locking means including a catch member which can be advanced and locked in a position in which it extends in front of the wheel rim in the vicinity of the bar to prevent rearward movement of the bar.

In the foregoing description of features, the terms "rear", "forward", and "rearward" relate to the direction faced by the vehicle. Thus the "front" of the wheel faces the front of the vehicle and "forward movement" is a movement towards the front of the vehicle.

A device which can be coupled to a steering wheel by first inserting its hook through the wheel from the rear of the wheel as above described can equally well be coupled to the wheel in an analogous manner by first inserting the hook through the wheel from the front thereof. In the latter case the locking means would operate to extend and lock the catch member in a position in which it extends behind the wheel rim in the vicinity of the bar.

A particularly advantageous feature is the provision of a lock mechanism which automatically locks the device to the wheel as the catch member is advanced into its operative position. Such a lock mechanism can be very conveniently operated if the said catch member is connected to a control member which is slidable along or along part of the steering-obstructing bar.

The accompanying drawings show by way of example, a particular anti-theft device according to the invention.

DESCRIPTION OF THE PREFERRED EMBODIMENTS

Figure 4:
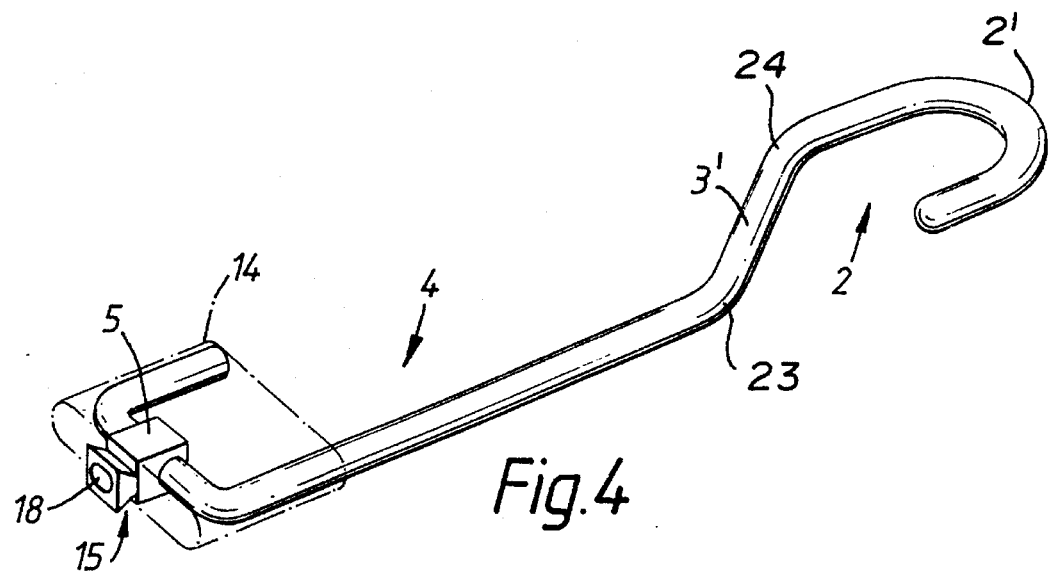
FIG. 4 shows a component of the device with an attached lock keeper.
Figure 5:
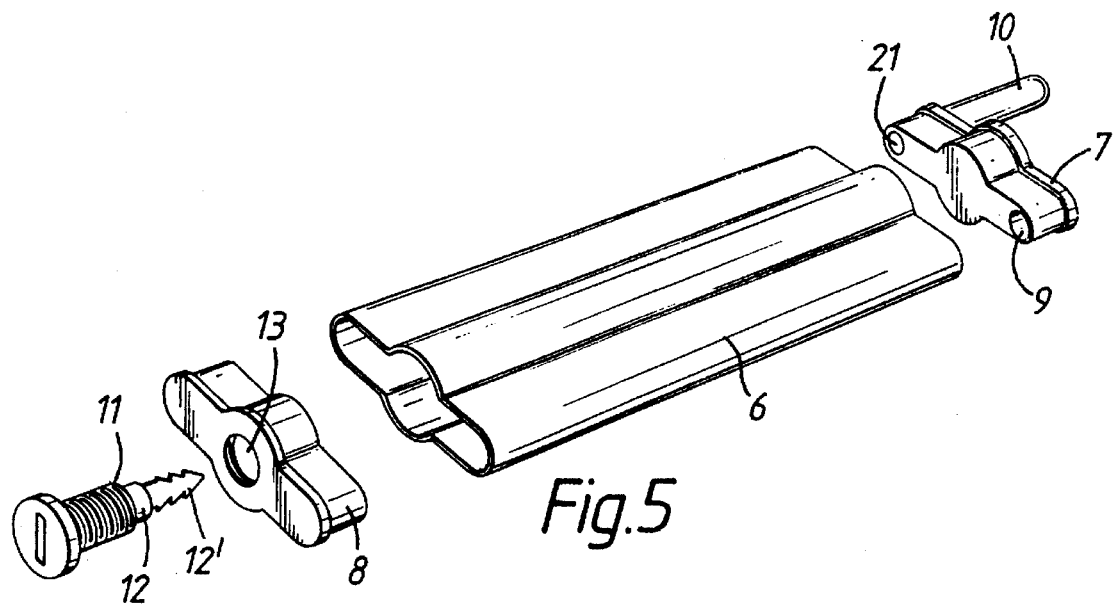
FIG. 5 is an exploded view of a part of the steering-obstructing bar and associated parts.
Figure 6:
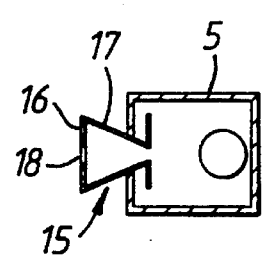
FIG. 6 is a detail of the lock mechanism.

Referring to the drawings, the illustrated device comprises a steering-obstructing bar 1 from which projects a hook member 2. The hook member 2 comprises a hook 2' formed at one end of a shank 3, the other end portion of which (see FIG. 4) is bent into the form of the letter "J" and forms an inner or core portion 4 of the bar 1. The inner end of the core portion 4 remote from the hook member 2 carries a lock keeper 5. The "J" portion may be encased in a slider 14 which may carry the lock keeper 5.

A sleeve 6 receives and is slidable along the core portion 4 and forms the outer part or shell of the bar 1. End pieces 7 and 8 are secured in the ends of the sleeve. The end piece 7 has a hole 9 through which the shank 3 is threaded when the parts are being assembled, and carries a catch member 10 formed by or with a hardened steel pin 21. When the sleeve 6 having been slid away from the hook 2', is at its retracted position, the end piece 7 abuts against the slider 14.

Figure 1:
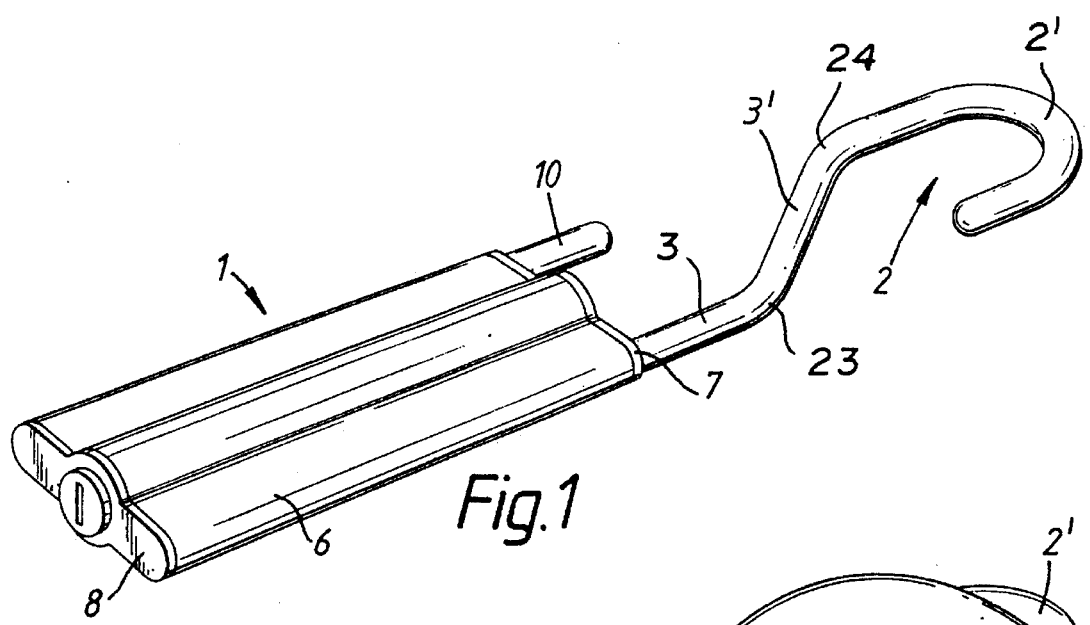
FIG. 1 is a pictorial view of the device.
Figure 2:
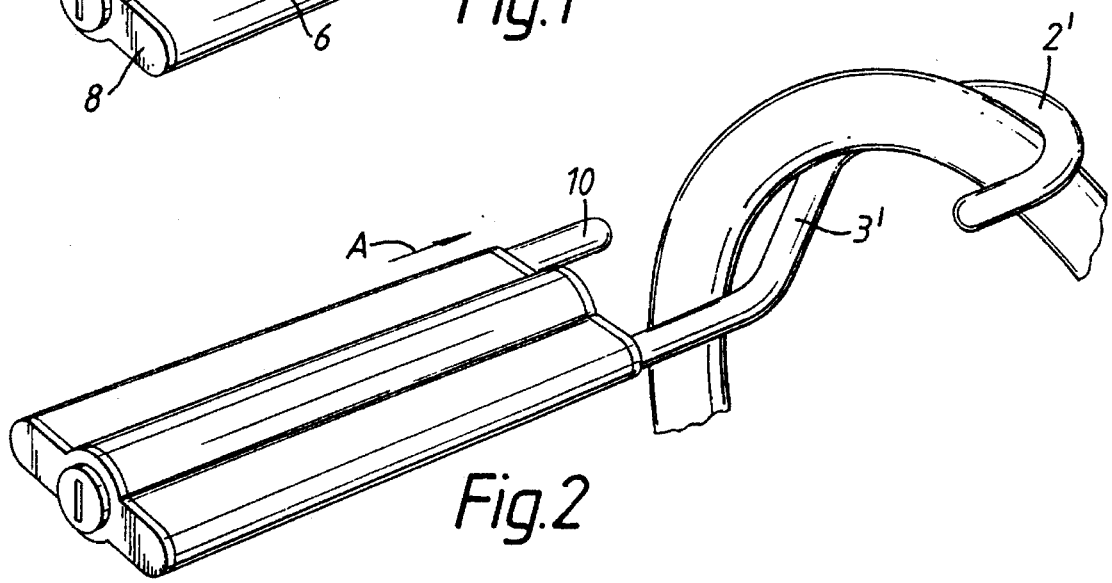
FIG. 2 shows a stage in the fitting of the device to a vehicle steering wheel.
Figure 3:
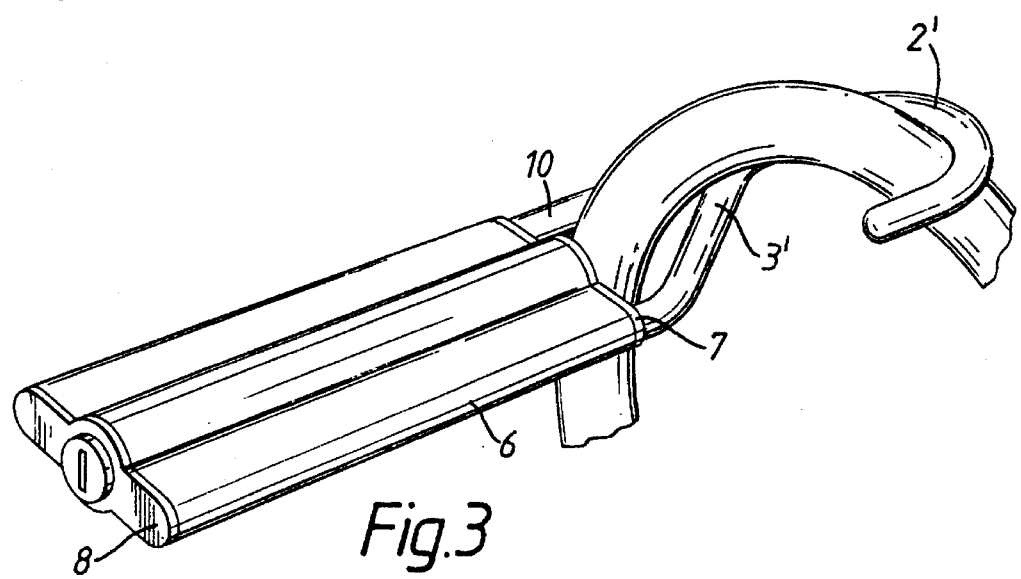
FIG. 3 shows the device locked onto the wheel.

In order to fit the device onto a steering wheel, the operator takes hold of the device by the sleeve 6, the sleeve being in its retracted position withdrawn away from the hook 2', and manipulates the device so as to thread the hook 2' through the steering wheel and engage the hook over the steering wheel rim. The operator then swings the bar 1 upwardly and forwardly to bring the device into the position shown in FIG. 2 in which a portion of the hook shank 3 in the vicinity of the bar 1 bears against the wheel rim and the diagonally inclined part 3' of the shank 3 between its two bends 23, 24 is close to or also bears against that rim. The operator then slides the sleeve 6 away from its retracted condition and forwardly along the core portion 4 towards the hook 2' as far as it will go. This sliding movement advances the catch member 10 into a position in front of the wheel rim, as shown in FIG. 3, and at the same time the end piece 7 at the leading end of the sleeve 6 is brought into a position where it bears against the rim of the steering wheel.

The forward sliding movement of the sleeve 6 can for example be limited by abutment of a locking device carried by the end piece 8 against the lock keeper 5. This locking device includes a lock barrel 11, from which a locking pin 12 projects, the barrel 11 being screwed into a socket 13 in the end piece 8. The lock keeper 5 incorporates a retainer 15 having a face plate 16 with integral rear spring jaws 17. The face plate has a central aperture 18. Just before the sleeve 6 reaches the end of its movement in the direction towards the hook 2' and the catch member 10 has been engaged with the wheel rim, the locking pin 12 penetrates the aperture 18 and one or more of a plurality of sets of shoulders 12' at the end of the pin abut against and force open the jaws 17, and finally pass beyond them so that the jaws 17 snap back behind the last of the pairs of shoulders 12' which can be engaged when the bar 1 is pushed towards the hook 2' as far as it can be made to go.

Thereby the sleeve is locked against retraction and the device is locked against removal from the steering wheel. Turning of the wheel is obstructed by abutment of the bar 1 against a fixed part of the vehicle or against the body of the person attempting to drive the vehicle.

The device can only be removed by unlocking the lock mechanism, using the appropriate key. Turning of the key causes the locking pin 12 to turn through about 90°, it may be against the action of a biasing spring in the lock barrel, into a position in which its shoulders 12' are in line with the mouth of the jaws 17. With the pin in that position it can be withdrawn from engagement with the lock keeper 5 and the sleeve 6 can be retracted away from the hook 2', so allowing the device to be removed from the steering wheel.

It will be noted that when the device is thus fitted to the steering wheel, the hook member 2 with its shank 3 extends from one end to the other of a segment of the steering wheel rim. The bar 1 projects from the wheel substantially in line with a notional chord of the steering wheel joining the ends of that segment. The said segment is preferably quite short, for example one which subtends an angle of less than 100°, or even less than 90°, at the center of the wheel. Compactness of the device is promoted if the diagonally inclined portion 3' of the hook shank 3 is at an angle to the general planes of the bar 1 and the hook 2'.

Figure 7:
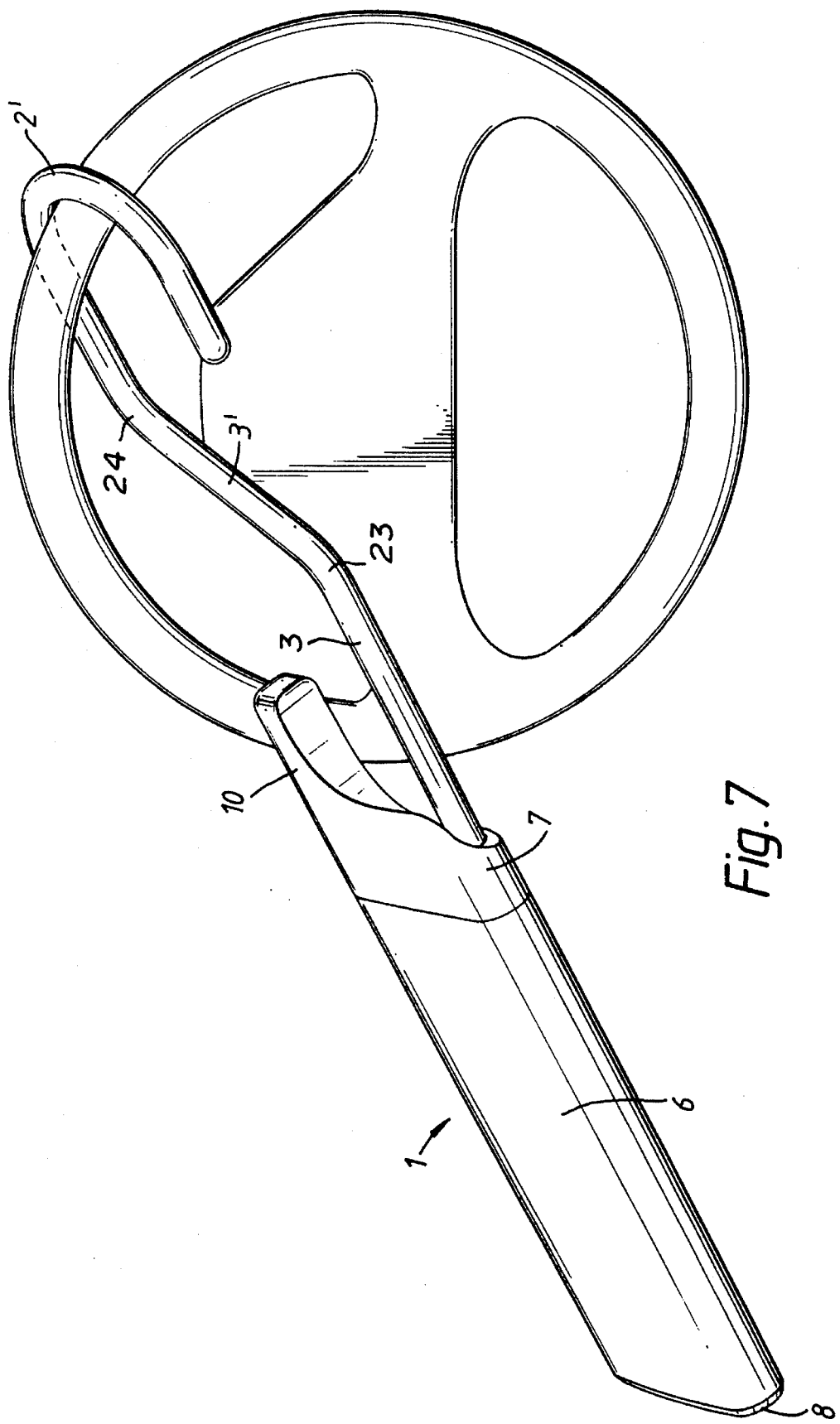
FIG. 7 is a pictorial view of a second embodiment of the invention.
Figure 8:
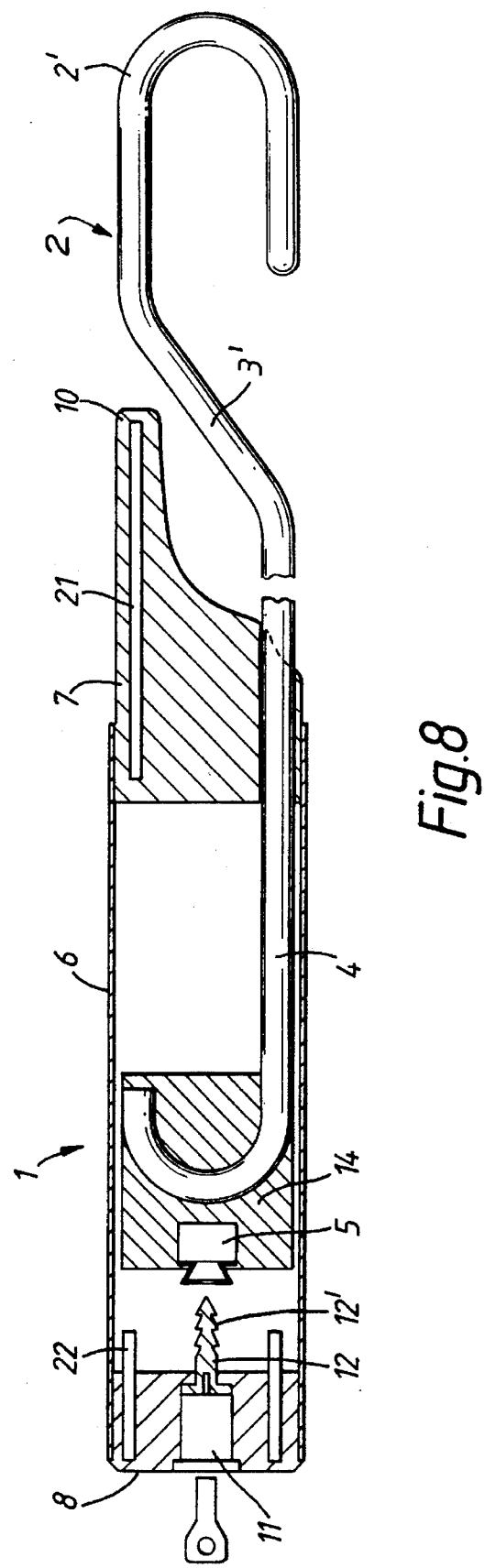
FIG. 8 is a sectional view of the embodiment of FIG. 7.

In the embodiment shown in FIGS. 7 and 8, the anti-theft device comprises a hook member 2 with a shank 3 so shaped that when locked to a steering wheel rim the hook 2' and shank 3 extend from one end to another of a segment of the steering wheel rim via a path passing through the wheel, with the hook member 2 being engaged about the rim at one end of the segment and with the shank 3 lying against the rim at the other end of the segment. 10 again represents a catch member which is carried at the inner end of a hollow bar member 1 which is movable along the core portion 4 so as to engage behind the wheel rim to lock the shank 3 against the rim. Thus when the device is locked onto the steering wheel rim it makes essentially S-shaped line contact with the rim in a manner such that removal of the device can only be accomplished by sliding the bar 1 along the core portion 4 until the catch 10 is disengaged from the rim.

As is shown in FIG. 8, the bar member 1 has an outer shell 6 of extruded metal which is closed by end caps 7 and 8. The end cap 7 is shaped so that the catch 10 is integral with the end cap and surrounds an embedded hard metal bar 21 which constitutes an anti-sawing protective device. The end cap 8 also has embedded hard metal anti-saw bars 22.

In other respects the embodiment of FIGS. 7 and 8 is generally similar to the embodiment of FIGS. 1 to 6.

A device according to the invention can be formed so that it will fit the steering wheels of most if not all of the mass produced cars currently in use. The opposite limbs of the hook or rim-receiving portion ("crook") of the hook member can converge towards one another such that their spacing at the region where they meet is sufficient to accommodate only a thin steering wheel rim.

A rim which is too thick to fully seat into the crook of the hook member will abut against the opposed crook limbs at a position nearer the crook mouth. In that case the device will only be able to span a reduced chordal distance across the steering wheel. However, thicker-rimmed steering wheels are generally of smaller diameter than thin-rimmed steering wheels so that the range of chordal distances is reduced, and hence this will not matter.

I claim:

1. A vehicle anti-theft device which is lockable onto the rim of a vehicle steering wheel, the device comprising a bar (1) for obstructing steering when the device is locked onto the steering wheel rim, and means (2, 3, 10) for securing the device to the steering wheel rim in a position with the bar (1) projecting away from the wheel so that it obstructs steering, said means for securing comprising a hook member (2) shaped so that it can be inserted through the steering wheel rim and hooked thereover to engage the same, and a catch member (10) connected to the hook member (2) and moveable relative thereto between a retracted position in which the catch member (10) is retracted away from the hook member (2) and a locking position in which the catch member (10) is advanced towards the hook member (2) with the catch member (10) and the hook member (2) together forming an S-shaped configuration securing the device to the steering wheel rim such that the hook member (2) engages over a first portion of the steering wheel rim and the catch member (10) engages over another portion of the steering wheel rim and said portions define a segment across which the device extends, the device further comprising locking means for locking the catch member (10) relative to the hook member (2) in the locking position in order to lock the device on the steering wheel rim.

2. A device according to claim 1, wherein the hook member (2) comprises a hook (2') and a shank (3) and wherein the catch member (10) is connected to the shank (3) and is moveable therealong between the retracted position wherein an elongated section of the shank (3) is exposed and the locked position wherein a reduced portion of the shank (3) is exposed.

3. A device according to claim 2, wherein the hook (2') and the shank (3) are an integral extension of the bar (1).

4. A device according to claim 2, wherein the hook member (2) is an endwise extension of said bar (1), and wherein the shank (3) of the hook member (2) is slidable telescopically with respect to said bar.

5. A device according to claim 1, wherein the bar (1) incorporates the catch member (10).

6. A device according to claim 1, wherein the locking means is effective when the catch member (10) is in the locking position to automatically lock the catch member (10) to prevent retraction of the same in the direction away from the hook member.

7. A device according to claim 6, wherein said bar includes a housing (6) with an end cap (7) thereon, said catch member (10) being carried on the end cap (7) of the housing (6), a core member (4) comprising an extension of a shank (3) and extending into said housing wherein said housing (6) together with said end cap (7) and said catch member (10) are slidable to and fro along the core member (4).

8. A device according to claim 7 and wherein said housing has a second end cap (8), said core member (4) carries a lock keeper (5) and a key-operated locking element (12) is carried on said second end cap (8) of said housing (6); and wherein when said housing (6) and the catch member (10) are advanced to place the catch member (10) in the locking position, the locking element (12) lockingly engages the lock keeper (5) to secure the housing (6) and the catch member (10) in the locking position with key operation being required to unlock said element (12) from locking engagement with said lock keeper (5), whereafter the housing (6) together with the catch member (10) can be retracted away from the hook member (2) into the retracted position.

9. A vehicle anti-theft device which is lockable onto the rim of a vehicle steering wheel with part of the device projecting from the wheel so that it obstructs steering, said device comprising a steering-obstructing bar (1) having integral means for securing such bar to a steering wheel, such means comprising (i) a hook member (2) whose shank (3) extends from the bar and is of such shape and length that by bodily manipulation of the device a hook (2') of the hook member can be inserted through the wheel from the rear thereof and hooked over a first portion of the wheel rim and then swung into a position in which a portion of the shank (3) bears against a second portion of the wheel rim at the rear thereof and forward movement of the bar (1) is obstructed and (ii) locking means which is then operable for locking the device against removal from the wheel, said locking means including a catch member (10) which can be advanced and locked in a position in which it extends in front of the wheel rim in the vicinity of said shank (3) to prevent rearward movement of the bar, the hook member (2) and the catch member (10) together forming an S-shaped configuration wherein the catch member (10) is movable relative to the hook member (2) between a retracted position for engaging and disengaging the device from the steering wheel and an advanced position for securing the device to the steering wheel.

10. A vehicle anti-theft device which is lockable onto the rim of a vehicle steering wheel, the device comprising a bar (1) projecting away from the wheel and obstructing steering when the device is locked onto the rim of a steering wheel, the device has a hook member (2) for securing said device to the rim, said hook member (2) having a hook (2') and a shank (3) and being shaped to extend from one end to the other of a segment of the steering wheel rim via a path passing through the wheel with the hooked over the wheel rim at one end of such segment, the device having a catch member (10) movable relative to the hook member (2) and engageable with the steering wheel rim for locking the device in such relationship to the wheel that the hook (2') is engaged about the rim at one end of said segment and the shank (3) which is integral with the hook (2') is secured to lie against the wheel rim at the other end of said segment, the hook member (2) with its shank (3) are an endwise extension of said bar (1), said hook member and its shank being slidable telescopically with respect to said bar, said bar (1) incorporating the catch member (10) which can be advanced relative to the hook member (2) to a locking position in which a portion of the steering wheel rim adjacent one end of the bar (1) is trapped between the catch member (10) and the shank (3) of the hook member, said bar (1) including a housing (6) with an end cap (7) thereon, said catch member (10) being carried on the end cap (7) of the housing (6), a core member (4) comprising an extension of the shank (3) and extending into said housing wherein said housing (6) together with said end cap and said catch member are slidable to and fro along the core member (4).

11. A device according to claim 10 and wherein said housing has a second end cap (8), said core member (4) carries a lock keeper (5) and a key-operated locking element (12) is carried on said second end cap (8) of said housing (6); and wherein when said housing (6) and the catch member (10) are advanced to place the catch member (10) in the locking position, the locking element (12) lockingly engages the lock keeper (5) to secure the housing (6) and the catch member (10) in the locking position with key operation being required to unlock said element (12) from locking engagement with said lock keeper (5), whereafter the housing (6) together with the catch member (10) can be retracted away from the hook member (2) into a retracted position.

12. A device according to claim 10, including locking means effective when the catch member (10) is in the locking position to automatically lock the catch member (10) to prevent retraction of the same in the direction away from the hook member.

13. A device according to claim 12 wherein said housing has a second end cap (8), said core member (4) carries a lock keeper (5) and a key-operated locking element (12) is carried on said second end cap (8) of said housing (6); and wherein when said housing (6) and the catch member (10) are advanced to place the catch member (10) in the locking position, the locking element (12) lockingly engages the lock keeper (5) to secure the housing (6) and the catch member (10) in the locking position with key operation being required to unlock said element (12) from locking engagement with said lock keeper (5), whereafter the housing (6) together with the catch member (10) can be retracted away from the hook member (2) into a retracted position.

* * * * *